Jan. 22, 1957     F. S. LAPEYRE ET AL     2,778,055
MACHINE FOR PEELING SHRIMP
Filed April 10, 1952     10 Sheets-Sheet 1

FIG. 1.

INVENTORS
FERNAND S. LAPEYRE
JAMES M. LAPEYRE, III
EMILE M. LAPEYRE
BY Wilkinson & Mawhinney
ATTORNEYS Jan. 22, 1957  F. S. LAPEYRE ET AL  2,778,055
MACHINE FOR PEELING SHRIMP
Filed April 10, 1952  10 Sheets-Sheet 4

INVENTORS
FERNAND S. LAPEYRE
JAMES M. LAPEYRE, III
EMILE M. LAPEYRE
BY Wilkinson & Mao Kinney
ATTORNEYS Jan. 22, 1957  F. S. LAPEYRE ET AL  2,778,055
MACHINE FOR PEELING SHRIMP
Filed April 10, 1952  10 Sheets-Sheet 6

INVENTORS
FERNAND S. LAPEYRE
JAMES M. LAPEYRE, III
EMILE M. LAPEYRE

BY Wilkinson & MawKinney
ATTORNEYS

INVENTORS
FERNAND S. LAPEYRE
JAMES M. LAPEYRE, III
EMILE M. LAPEYRE
BY Wilkinson & Mawhinney
ATTORNEYS

United States Patent Office 2,778,055
Patented Jan. 22, 1957

2,778,055

MACHINE FOR PEELING SHRIMP

Fernand S. Lapeyre and James M. Lapeyre III, New Orleans, and Emile M. Lapeyre, Houma, La., assignors to The Peelers Company, Houma, La., a partnership Application April 10, 1952, Serial No. 281,507

5 Claims. (Cl. 17—2)

The present invention relates to improvements in a machine for peeling shrimp and constitutes certain improvements over the machine disclosed in our prior patent granted January 9, 1951, No. 2,537,355.

The present invention has the same general objects and purposes as those set out in our prior patent aforesaid together with certain further objects and purposes which are the result of the improvements referred to which will hereinafter be more fully described.

An object of the present invention is to improve the efficiency of the machine by changes in construction in the manner of powering the rollers, the finger frames, the cam and cam followers which assist in raising and lowering such finger frames and in the means for holding the insert rollers in position.

Another object of the invention is to improve the manner in which the fingers are mounted in the finger frames and by which the fingers are prevented from turning out of correct positions.

A further object of the invention is to change the function of the machine particularly insofar as it relates to the finger frames and cams which actuate the same.

It has been found that an improved peeling action is obtained by maintaining the pressure of the fingers against the shrimp in the upper section of the machine for a longer period of time.

The "working period" in the lower section of the machine may also be increased but care should be exercised so that excessive loss of pigmentation of the peeled meats as well as increased mutilation be avoided.

It is a still further object of the invention to divide the finger frames into two or more sections and to hinge the same to the main frame so that such finger frames may be more readily raised for cleaning purposes, and also in order to render the frames less susceptible to bending as in the case of larger frames and for the further purpose to provide for a longer "working period" in the upper section only.

With the foregoing and other objects in view which will become immediately apparent to those skilled in the art as the following more specific description proceeds, the critical features of the invention in both structure and mode of operation will be hereinafter more fully described.

In the drawings we have illustrated only one mechanical embodiment of which the invention is susceptible with certain modifications of details and in such drawings like parts are denoted by the same reference characters throughout the several views in which.

Referring more particularly to the drawings, 20 designates generally the rigid framework of the machine, 21 the rear wall of the machine, 22 a transverse beam or mid-abutment which divides the machine generally into a first or upper peeling section and a second or lower peeling section, and 23 represents a transverse beam at the lower or front end of the machine.

The shrimp to be peeled may be delivered to the machine through any appropriate agency, for instance by an endless conveyor 24 which delivers the shrimp to a hopper or guide trough 25 which is situated just forwardly of the rear vertical wall 21 and above the higher ends of the channels which are formed between the rollers as hereinafter described.

The channels in the first or upper section of the machine are formed by groups or associations of five rollers to the unit, and as many units as desired may be repeated transversely across the machine to provide a machine having a desired peeling capacity.

Figure 2:
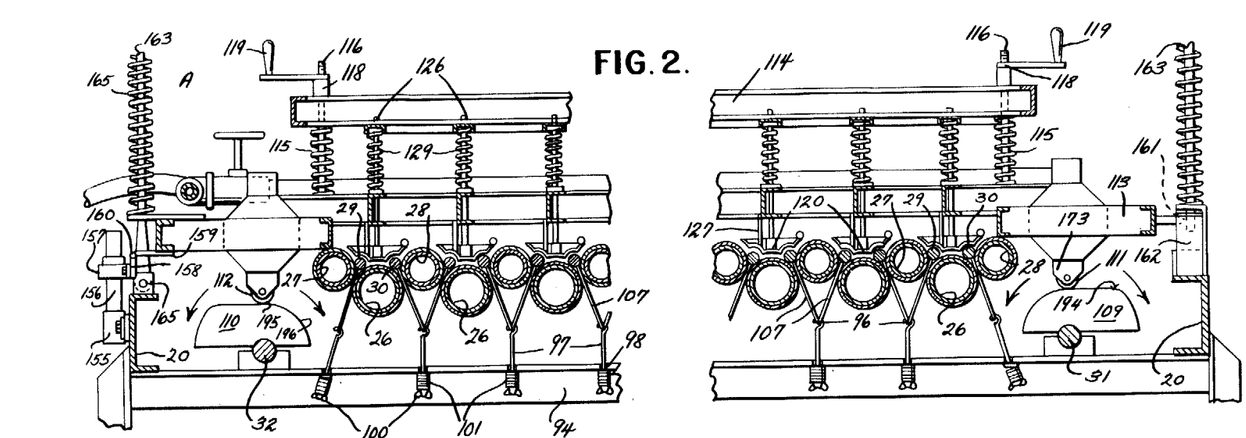
Figure 2 is a vertical transverse section taken at an enlarged scale through the rear portion of the machine on the line 2—2 of Figure 1.
Figures 13, 17, 18:
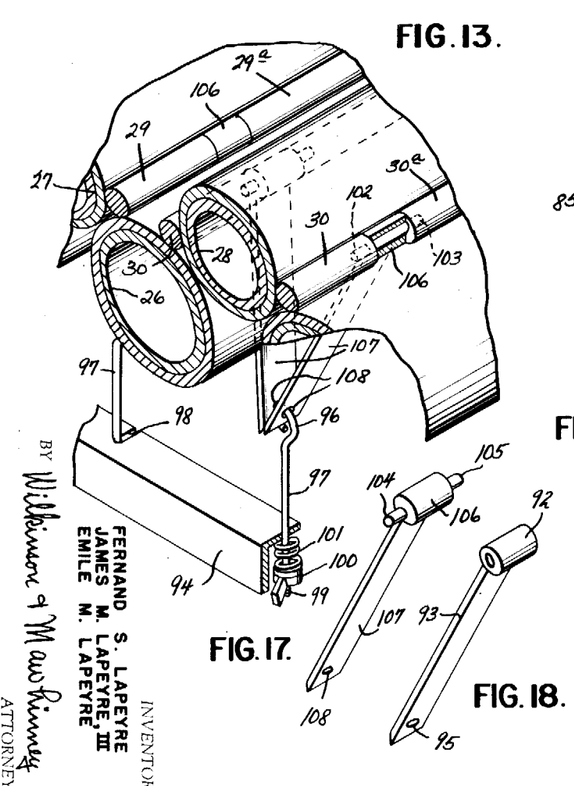
Figure 13 is a fragmentary perspective view with parts broken away and parts shown in section showing a unitary roller arrangement with shrimp trough or channel and with the intermediate hold-down devices as applied to the insert rollers.
Figure 17 is a perspective view of one of the intermediate hold-down devices.
Figure 18 is a similar view of one of the rear hold-down devices.

This association of rollers is best seen in Figures 2 and 13 and comprises a power roller 26 which forms the base of the channel, two channel forming rollers 27 and 28 which are mounted at a higher elevation than the power base roller 26 and spaced apart horizontally to the sides of such power roller; and insert rollers 29 and 30 mounted respectively between the power roller 26 and the channel forming rollers 27 and 28.

The power rollers 26 are sufficiently long to extend substantially the full length of the machine and extend in common to both the first and second peeling sections of the machine. Such power rollers 26 may be supported from the back wall 21 and at their lower end portions by base rollers 37, there being clearance between the rollers 26 and the beams 22 and 23. All of the rollers preferably incline forwardly and downwardly from the back wall 21 to the front beam 23 although an inclination is not essential inasmuch as the shrimp may be compelled to travel down the channels under the impelling action of a forceful water stream as explained in the prior patent aforesaid.

The channel forming rollers 27 and 28 and the insert rollers 29 and 30 are relatively shorter in length compared with the power rollers 26 and such rollers 27, 28, 29 and 30 extend only the length of the first or upper peeling section of the machine and may be mounted from the back wall 21 and from the mid-abutment beam 22.

The power rollers 26 and the channel forming rollers 27 and 28 may, and preferably do, all have fixed locations and they may be all of a diameter which, although not necessarily the same, is large in comparison with the diameters of the insert rollers 29 and 30. The power rollers 26 and the channel forming rollers 27 and 28 are so relatively mounted that their peripheries are separated a distance at their nearest points which is somewhat less than the diameters of the insert rollers 29 and 30. This is for the purpose of enabling the insert rollers 29 and 30 which are not fixedly mounted but are resiliently supported, as shown in Figure 13, to be forcibly urged constantly by spring pressure into the restricted throats between the power rollers 26 and the channel forming rollers 27 and 28; this for a two-fold purpose, namely, in the first place of supplying a high degree of frictional contact between each power roller 26, the insert rollers 29 and 30 and their respective idler channel forming rollers 27 and 28. In the second place, the spring pressure to which the insert rollers 29 and 30 is subjected provides a tight nip or bight between such insert rollers and the power roller 26 and respective channel forming rollers 27 and 28; this tight nip being desirable for promoting the highest efficiency in the "unwrapping" action upon the shrimp as hereinafter explained.

Viewing the apparatus from the aspect of Figure 2, six power rollers 26 are shown as mounted across the breadth of the machine in horizontally spaced and substantially parallel relation; and eight of the channel forming rollers 27 and 28 are illustrated, it being understood that the channel forming rollers 28 of the first channel on the left serves also as a channel roller for the next channel. In other words, all except the end channel rollers 27 and 28 serve as to opposite sides thereof as channel forming rollers for adjacent parallel channels.

Figure 3:
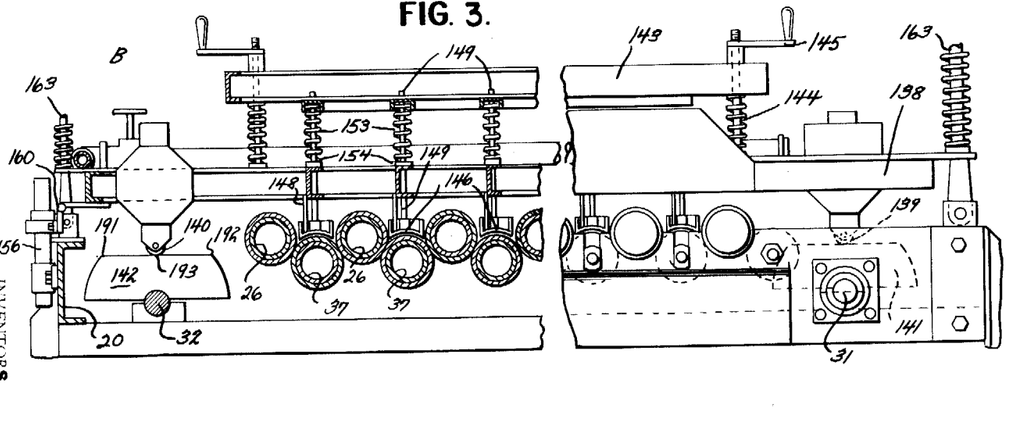
Figure 3 is a similar view to Figure 2 taken through a more forward position on the line 3—3 of Figure 1.

Again viewing Figure 3, it will be seen that two of the power rollers 26 and an associated base roller 37 together combine in a substantially inverted triangular relation with the base roller 37 forming the base of a channel defined laterally by adjacent horizontally spaced power rollers 26 with the channels of the lower or second section being offset laterally from the channels of the first or upper section of the machine. The power rollers 26 rotate in friction contact with the peripheries of the base rollers 37 to thereby impart rotation thereto.

The power rollers are given an oscillating movement through a desired angular degree, for instance one and one-half turns in each direction. Any appropriate actuating mechanism may be employed for this purpose. For instance, as shown in Figures 4, 5 and 9, the power rollers are equipped with pinions 45 which engage a reciprocating toothed rack 46.

Whereas, as appears from Figure 1 of our patent aforesaid, the cams formerly received their motion from cam shafts with a continuous rotary motion, the present cam shafts 31 and 32 are given an oscillating motion which, for example, may be of the order of ninety degrees of angular movement.

Such oscillatory movement of the cam shafts 31 and 32 is secured through a novel form of power gear toothed rack 46, 46ª and gear arrangement which imparts oscillatory motion from one cam shaft 31 to the other cam shaft 32 and also to the peeling rollers.

Figures 4, 5:
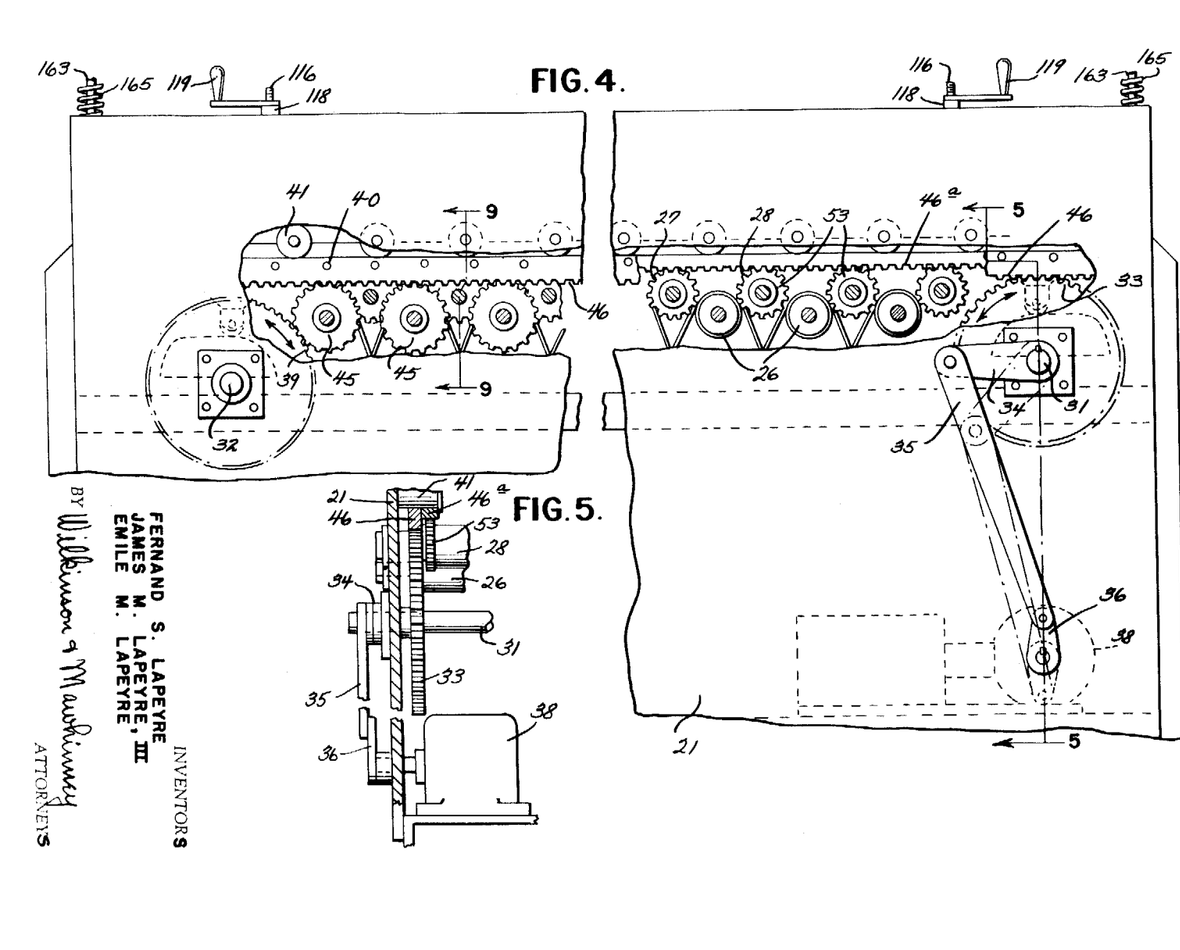
Figure 4 is an enlarged rear elevational view of the machine with portions of the back plate broken away showing the roller drive mechanism and the cam lifting device for the finger frames.
Figure 5 is a fragmentary longitudinal vertical section taken on the line 5—5 of Figure 4.
Figure 9:
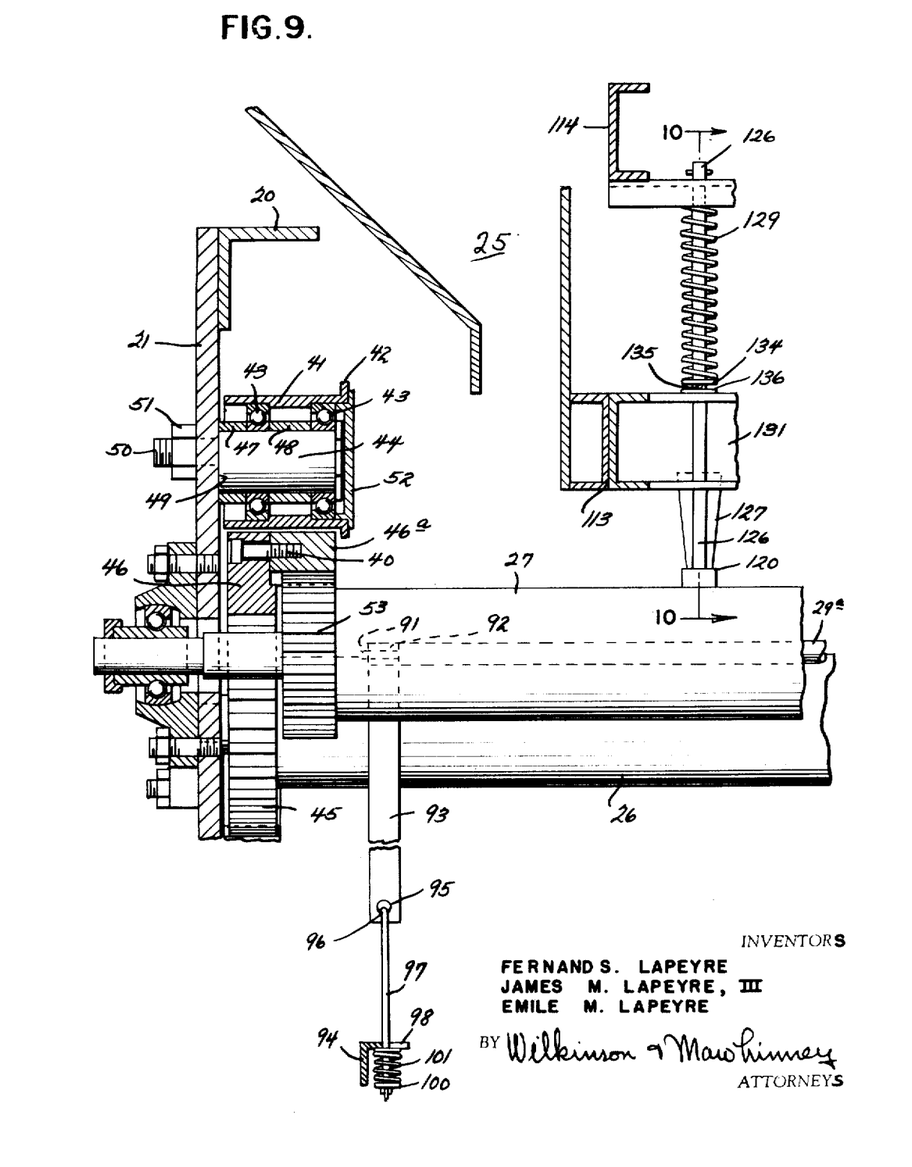
Figure 9 is a fragmentary longitudinal sectional view taken on an enlarged scale on the line 9—9 of Figure 4.

Still referring to Figures 4, 5 and 9, the rear end of cam shaft 31 passes through the back plate 21 and has fixed thereon an arm 34 pivoted to the upper end of a link 35 which at its lower end is in turn pivoted to an arm or crank 36 driven by a motor 38 or motorized speed reducer; the latter being bolted to the inner side of the back plate 21 or mounted to the machine in other desired manner.

Fixed on the cam shaft 31 is a drive gear wheel 33 located on the inside of the back plate 21 and disposed in mesh with the lower rack bar 46, communicating to the latter a reciprocating motion as the drive gear 33 receives oscillating movement from the cam shaft 31. The shaft 31 is therefore a combined cam shaft and power drive shaft.

The upper rack bar 46ª is secured by bolts 49 (Figure 9) to the lower rack bar 46 constituting a stepped rack bar assembly which receives reciprocatory motion directly from oscillating drive gear 33.

The lower rack bar 46 rests upon and meshes in common with all of the toothed pinions 45 affixed to the power rollers 26. The upper rack bar 46ª rests upon and meshes in common with all of the toothed pinions 53 affixed to the channel-forming rollers 27 and 28. Thus the rollers 26, 27 and 28 receive oscillatory motion from the reciprocating stepped rack bar assembly.

The second cam shaft 32 receives its oscillating motion by engagement of a follower gear wheel 39 affixed on shaft 32 with a pinion 45 of a power roller 26. The follower gear wheel 39 is affixed to the upper end portion of shaft 32 just inside the back plate 21. Both cam shafts 31 and 32 extend the entire length of the machine at opposite side portions of the machine frame. The cam shaft 32 which is the follower shaft is disposed below the level of the drive cam shaft 31 and closer to the center line of the machine so that the follower gear wheel 39 does not engage the teeth of the rack bar assembly but meshes with the adjacent end pinion 45 of the end power roller 26. The purpose in applying power to the follower cam shaft 32 in this manner is to give this shaft 32 angular movement opposed to that of the drive cam shaft 31 so as to neutralize any side thrust to the finger frames in the lifting operation.

The step-rack assembly 46, 46ª is held in contact with the gear wheels 33, 45, 53 by a number of hold-down rollers distributed at suitable points along the length of the rack. Each hold-down roller is composed of a metallic shell 41 provided with an outstanding flange 42 at its forward edge. The shell 41 is cylindrical and freely rotates upon ball bearings 43 mounted upon a central post 44 on which are slidably fitted spacer sleeves 47 and 48 for correctly locating the ball bearings, the inner faces of the bearings being spaced by the sleeve 48 and the sleeve 47 serving to space the rear bearing from the back plate 21. The post carries a reduced threaded stud 50 entered through the back plate 21 to which it is attached by the nut 51. The shoulder 49 of the post 44 abuts against the forward face of the back plate 21. A flanged cap plate 52 removably encloses the forward end of the hold-down roller shell 41.

As appears in Figure 9 the flange 42 projects in front of the upper rack bar 46ª to prevent the rack assembly from moving away from the back plate 21 by force of gravity or otherwise.

The upper rack bar 46ª rests upon and drives pinions 53 affixed to the rear upper ends of the rollers 27, 28. Thus in the upper section all peeling rollers 26, 27 and 28 are positively driven by the rack bar assembly. The rollers 26, 27 and 28 are driven in the same direction while the insert rollers 29, 30 are driven frictionally in relatively opposite directions. In the lower section the power rollers 26 frictionally drive the base rollers 37 in relatively opposite directions.

Figure 11:
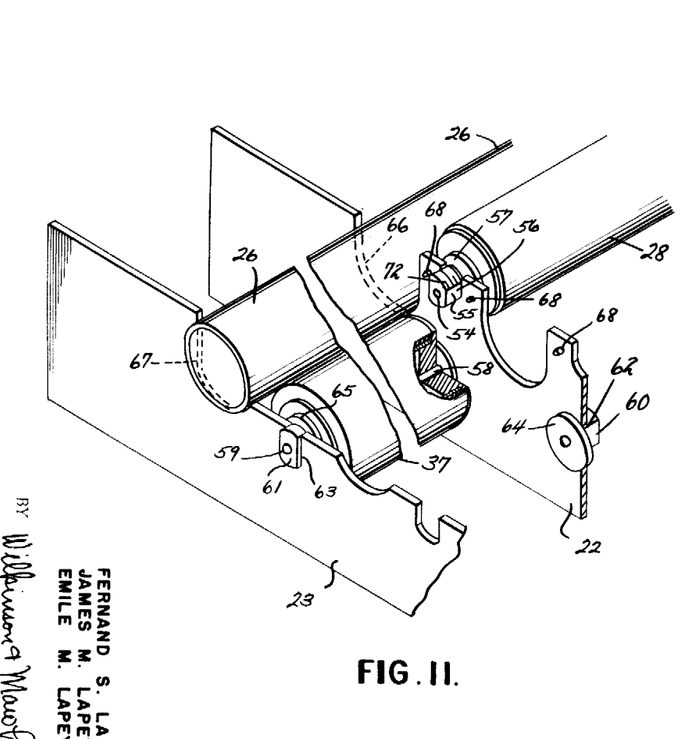
Figure 11 is a fragmentary perspective view showing the mounting of the rollers in the intermediate and front transverse beams.
Figures 12, 15A, 19:
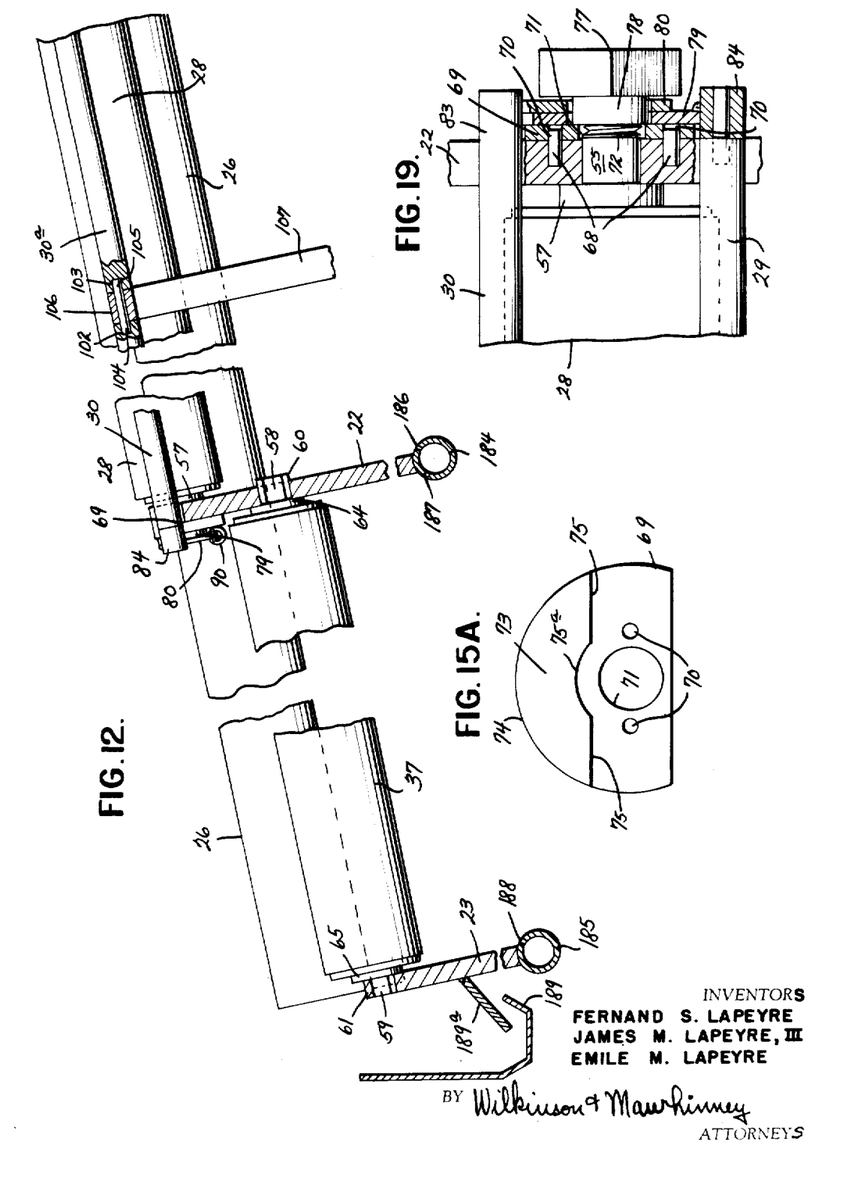
Figure 12 is a fragmentary longitudinal sectional view with parts broken away and parts shown in section and illustrating the mounting of the rollers in the intermediate and front transverse beams and the intermediate and lower hold-down devices for the insert rollers.
Figure 15a is a front face view of a form of washer employed.
Figure 19 is a horizontal sectional view taken on the line 19—19 in Figure 14.

Referring more particularly to Figures 11 and 12, the channel-forming rollers 27 and 28 are journaled at their lower forward ends in the mid-abutment or transverse beam 22. Such rollers 27 and 28 are equipped with trunnions 54 journaled in bearing blocks 55 which are square or of other straight-line external form and fitting removably and non-rotatively in similarly formed slots 56 in the upper portion of the mid-abutment 22. Such slots 56 open through the upper edge of the mid-abutment 22 to permit the bearing blocks 55 to be introduced and removed by sliding up and down movements. Such bearing blocks carry flanges or collars 57 interposed between the lower forward ends of the channel-forming rollers 27, 28 and the rear surface of the mid-abutment 22 so as to space the lower ends from the mid-abutment 22. The upper and lower threaded surfaces of the bearing blocks 55 may be rounded or domed while thte sides are plain and flat. The bearing blocks 55 may also extend forwardly of the mid-abutment 22 in order to give ample bearing surface for the trunnions 54, the mid-abutment 22 being ordinarily rather too thin for this purpose.

The base idler rollers 37 of the lower section are provided with upper trunnions 58 and lower trunnions 59 rotatably mounted respectively in bearing blocks 60 and 61; such bearing blocks being also of preferably square or straight-line external configuration to fit slidably in similarly shaped openings, 62 and 63 in the mid-abutment 22 and front transverse beam 23 respectively. The openings 62 may be in intermediate portions of the mid-abutment 22 so that the bearing blocks 60 are introduced thereinto by slidable motion in an axial direction; while the openings 63 in the lower transverse beam 23 may open upwardly through a cut-down section of the beam 23 whereby the bearing blocks 61 may be introduced by downward sliding movement into the openings 63 and withdrawn by similar upward sliding motion. The bearing blocks 60 carry flanges or collars 64 interposed between the front face of the mid-abutment 22 and the adjustment rear ends of the rollers 37. The bearing blocks 61 carry flanges or collars 65 facing rearwardly of the bearing blocks 61 and interposed between the lower ends of the rollers 37 and the rear face of the lower transverse beam 23.

The power or drive rollers 26, where the same pass through the mid-abutment 22 and lower transverse beam 23, are accommodated in semi-circular or other forms of cut-away portions 66 and 67.

Figures 14, 15, 16:
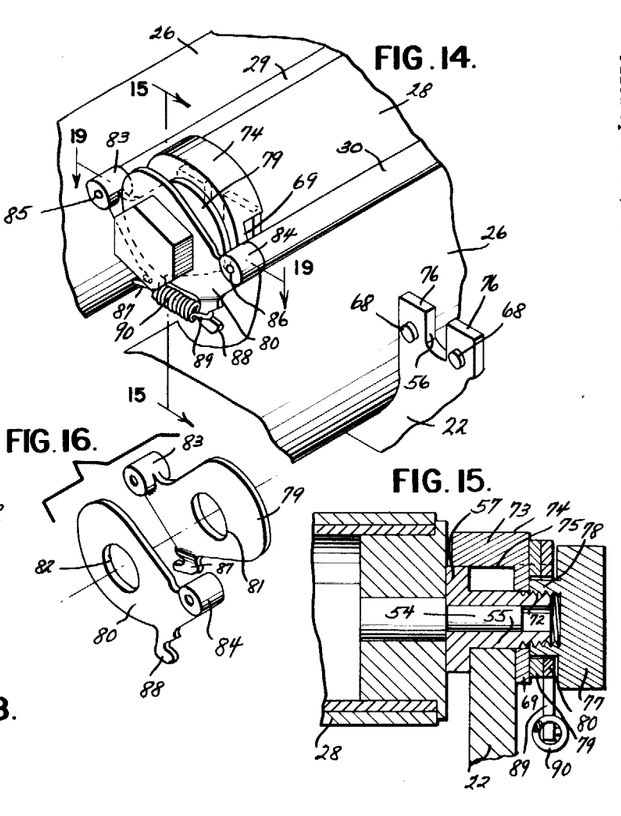
Figure 14 is a fragmentary perspective view with parts broken away showing the front hold-down devices and insert roller keepers.
Figure 15 is a longitudinal fragmentary section taken on the line 15—15 in Figure 14.
Figure 16 is a perspective view showing the front hold-down devices and insert keepers in an exploded arrangement.

From Figures 11, 14 and 19 it will appear that pins 68 project from the lower forward face of the mid-abutment 22, one pin 68 at each side of the slots 56. Moon-shaped washers 69 are fitted upon the threaded bushings or bearing blocks 55 and against the front faces of the mid-abutment 22, such washers 69 having holes 70 (see Figure 15A) to receive the pins 68, as shown more particularly in Figure 19. The pins 68 orient and center the washers 69 and prevent the same from lifting. The washers have central openings 71 which are received freely over the threaded portions 72 of the bushings 55 as appears to best advantage in Figures 15 and 19.

Such washers 69 have rearwardly projecting heads or flanges 73 having rounded upper walls 74 and substantially flat straight lower horizontal walls 75 which give to the washers their moon-shaped appearance. The washer heads 73 overlie the mid-abutment 22 with the flat under surface 75 resting upon the shoulders 76 provided at the upper edge of the mid-abutment 22 at opposite sides of the slots 56. A portion of the flat washer wall 75 may also overlap a portion of the collar or shoulder 57 of the bushings 55 for which see Figure 15.

The flat wall 75 may also have a central upwardly rounded portion 75ª (Figure 15A) to fit the rounded upper edge of flange 57 of bushings 55 (see Figure 15). Confining nuts 77 having internally threaded hubs or shanks 78 are threaded upon the threaded portions 72 of the bushings 55 which project forwardly of the washers 69, which construction is best shown in Figures 15 and 19. The hub 78 is smooth externally to receive thereon a pair of rotatably mounted keeper and hold-down plates 79 and 80. These plates are more particularly shown in Figure 16 and have central openings 81 and 82 to receive the hubs 78. The plates 79 and 80 also have hollow bearings 83 and 84 at relatively opposite sides thereof positioned to receive the trunnions 85 and 86 on the lower ends of the insert rollers 29 and 30. At the under sides of the plates 79 and 80, the same are equipped with notched fingers 87 and 88 with the notches displaced angularly from one another and the notches facing in relatively opposite directions for the purpose of receiving the hook ends 89 of coil or other springs 90. The notched fingers 87, 88 will be bent or displaced out of the planes of the plates 79, 80 for the purpose of bringing the same into substantial alignment with the axis of the coil spring 90 so that the same may exert its yieldable pull upon the plates 79, 80 in a substantially axial direction. The spring 90 tends to contract thus rotating the plates 79, 80 in relatively reverse directions upon the nut hubs 78 to thus draw down the insert rollers 29, 30 into the crotches between the power rollers 26 and the channel-forming rollers 27, 28 for which see Figures 13 and 14.

The plates 79, 80 and the assembly constitute hold-down devices for the lower ends of the insert rollers 29, 30 and at the same time act as keepers for such insert rollers. Such devices are parts of the bottom assembly of the rollers in the upper section of the machine.

The bushings 55 are simply slipped over the roller journals 54 with the heads or shoulders 57 uppermost. Such bushings 55 are then lowered into the slots 56 of the mid-abutment 22 which is affixed to the side flanges of the machine at each end. The moon-shaped washers 69 are then fitted upon the threaded bushings 55 with the holes in the washers engaging the pins 68. The insert keeper plates 79, 80 are then shown placed upon the hub 78 of the insert keeper nut 77. The journals 85, 86 of the lower ends of the lower insert roller sections 29, 30 are slipped into the bearings 83, 84 of the plates 79, 80 and the nuts 77 are then screwed tightly upon the threaded portions 72 of the bushings 55, thus locking the assembly to the mid-abutment 22.

The insert keeper plates 79, 80 are not bound tightly between the moon-shaped washers 69 and the nuts 77 but the hubs 78 are long enough to loosely accommodate the plates 79, 80 between the nuts 77 and the washers 69 wherefore the plates 79, 80 are free to rotate under spring tension about the hubs 78. The purpose of the moon-shaped washers 69 is two-fold: in the first place such washers fill fouling spaces which would otherwise exist on top of the mid-plate or mid-abutment 22; and secondly the pins 68 which engage the holes 70 in the washers 69 prevent the lifting of the threaded bushings 55 or the lower ends of the rollers 27, 28 from the proper positions.

The insert rollers 29, 30 are preferably made in sections, the lower sections being represented at 29, 30 and the upper sections, at 29ª, 30ª, for which see Figures 9, 12, 13 and 14.

As shown more particularly in Figures 9 and 18, the upper sections of these insert rollers are equipped with trunnions 91 received in bearings 92 on the upper ends of metallic straps or bearing supports 93. These straps 93 pass down between the rollers 26 and either 27 or 28 and overlie a frame member 94 of angle or other section to which the straps 93 are yieldably connected. In the instance shown the lower ends of the straps 93 are perforated as indicated at 95 to receive hooks 96 on the upper ends of shanks 97 which shanks extend slidably and detachably through slots 98 made in the upper webs of the frame members 94. The lower ends of the shanks 97 are threaded as indicated at 99 to receive wing or other nuts 100. Coil springs 101 are wound in a suitable number of convolutions between the nuts 100 and the under sides of the upper webs of the frame members 94. By rotating the nuts 100 in proper directions, the tension of the coil springs 101 can be appropriately adjusted so as to pull down upon the straps 93 and entrained upper rear ends of the insert rollers 29ª, 30ª.

As shown more particularly in Figures 13 and 17, the adjacent ends of the insert roller sections 29, 29ª and 30, 30ª are formed with bearing recesses 102 and 103 which receive respectively trunnions 104 and 105 projecting from opposite ends of insert roller collars 106. These collars are carried upon the upper ends of metallic straps or bearing supports 107 formed at their lower ends with perforations 108 to receive the hooks 96 of hold-down shanks 97 of tension devices as shown in Figure 13.

These hold-down devices maintain with spring pressure the insert rollers in proper position in the respective crotches formed by the adjoining rollers 26, 27 and 28. The springs provide the necessary yieldable tension to keep the insert rollers in position against the rollers 26, 27 and 28. The hold-down devices 93, 107 are of thin metal and pass between the rollers 26, 27 and 28 at angles such as shown in Figure 13 so that one eye-bolt 97 may engage two hold-down devices.

Each cam shaft 31, 32 has a number of oscillating cams fixed thereon for lifting and lowering finger frames carrying pressure fingers.

Figure 1:
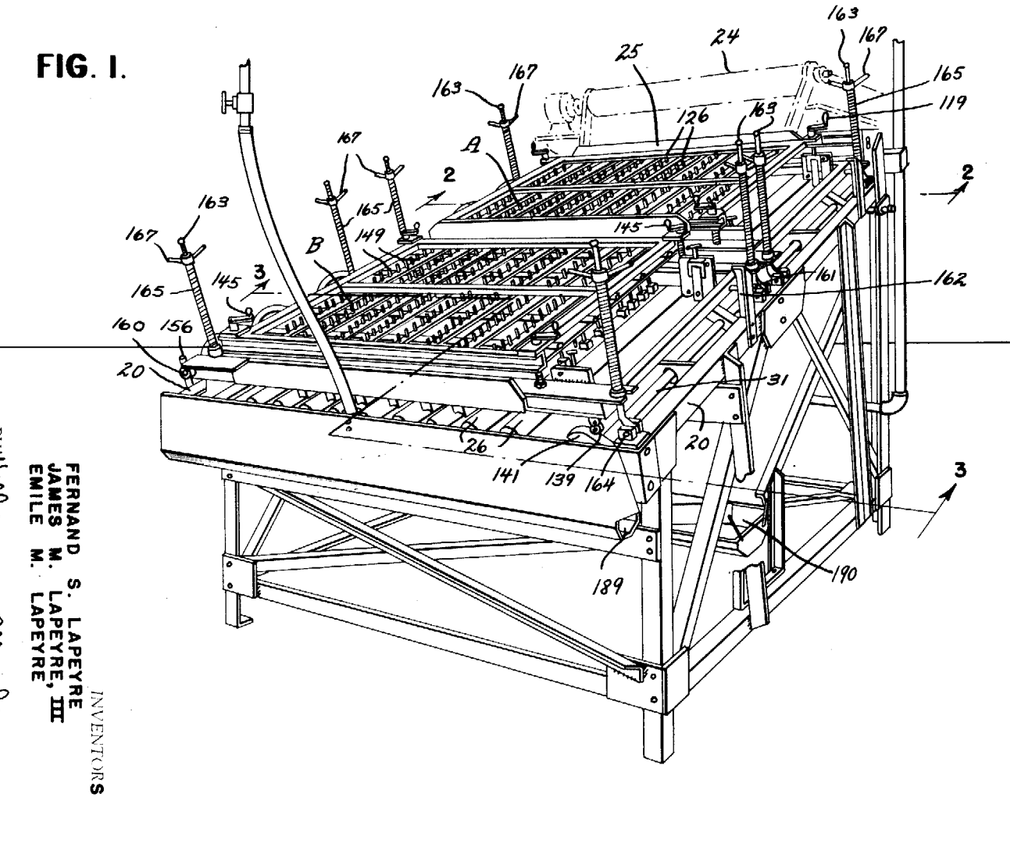
Figure 1 is a perspective view of a form of machine for peeling shrimp constructed in accordance with the present invention with the finger frames in the lowered operative position.

It will be seen from Figure 1, that unlike our patent aforesaid in which a single finger frame extends in common over the entire lower bed of the machine, in the present case two separate and independent finger frames are provided as representing any number of such frames.

These finger frames are designated in Figure 1 at A and B. The frame A overlies the peeling roller bed at the upper portion of the machine while the lower finger frame B extends over the lower section of the machine. These finger frames A and B are mounted for independent hinging movement so that the same may be raised or lowered independently of one another for the purpose of giving access to the roller beds of the upper and lower sections.

Figure 2 shows a section through the upper finger frame A while Figure 3 shows a section through the lower finger frame B.

The cam shafts 31 and 32 extend the full length of the machine and in common to both finger frames A and B.

However, the finger frames of the two sections are differentially operated by differences in cam conformation. The fingers of the two sections are also different in conformation.

In Figure 2 the cams 109 and 110 are fast on the cam shafts 31, 32 and are engaged by rollers or other cam followers 111 and 112 affixed to a lower finger frame section 113. The lower frame section supports an upper finger frame section 114 spaced above such lower section. Coil springs 115 are interposed at corner or other desired portions between the two frame sections 113 and 114 for the purposes of yieldably supporting the upper frame section 114 from the lower frame section 113, which latter is directly supported by the rollers 111, 112 on the cams 109, 110.

The coil springs 115 are wound about vertical rods 116, which rods are fixed in the lower frame as by nuts 117 threaded thereon. The rods 116 slide freely through the upper frame 114 and project thereabove, such projecting portions being threaded to receive nuts 118 having outstanding handles 119 to give leverage for convenience in rotating such nuts 118. When the nuts 118 are rotated in one direction the upper frame section 114 will be compelled to descend closer to the lower frame section 113, compressing the springs 115. When the nuts 118 are rotated in the opposite direction the springs 115 will elevate the upper frame section 114 to a relatively higher elevation above the lower frame section 113. The result is to adjust, that is to increase or decrease the pressure upon the fingers carried by the frame.

Figures 20, 21, 22:
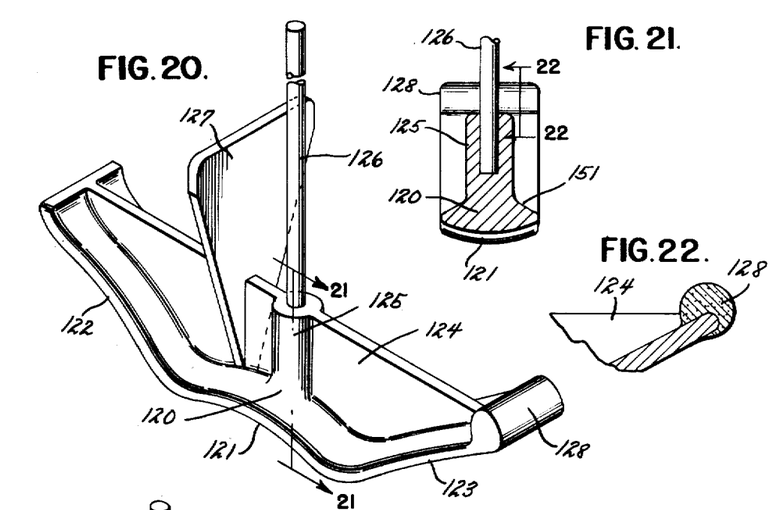
Figure 20 is a perspective view of a form of pressure finger employed.
Figure 21 is a vertical transverse section taken on the line 21—21 of Figure 20.
Figure 22 is a vertical longitudinal fragmentary section taken on the line 22—22 of Figure 21.

The reciprocating finger frame A receives fingers which are more particularly illustrated in Figures 20, 21 and 22.

Referring to these figures, each finger comprises generally a body of metal or other suitable material 120 so shaped as to fit the channels of the first sections shown in Figure 2 which channels comprise the power rollers 26, channel forming rollers 27, 28 and insert rollers 29, 30. For this purpose lower central sections 121 of the finger bodies are upwardly arched to conform generally to the curvature of the power rollers 26. Lateral upwardly arched sections 122 and 123 are made in upwardly extending diagonal portions of the finger body extending off the ends of the central section 121 which lateral arched sections conform generally to the curvature of the insert rollers 29, 30 providing clearance for the fingers in and about the insert rollers 29, 30. The parts 121, 122 and 123 may be of relatively thin section in a generally horizontal direction, all reinforced by a vertical strengthening web 124 which is merged with intermediate portions of such parts and also with a central socket 125 for a stem or rod 126. A guide web 127 upstands from the finger body 120 and preferably intercepts the web 124 so as to be reinforced thereby. This guide web 127 lies at one side of the center of the finger body 120 from which the stem 126 extends. To the opposite side of the center is a counterbalance weight 128 for the purpose of stabilizing the mass of the finger body 20 in its vertically reciprocating motion.

Figure 10:
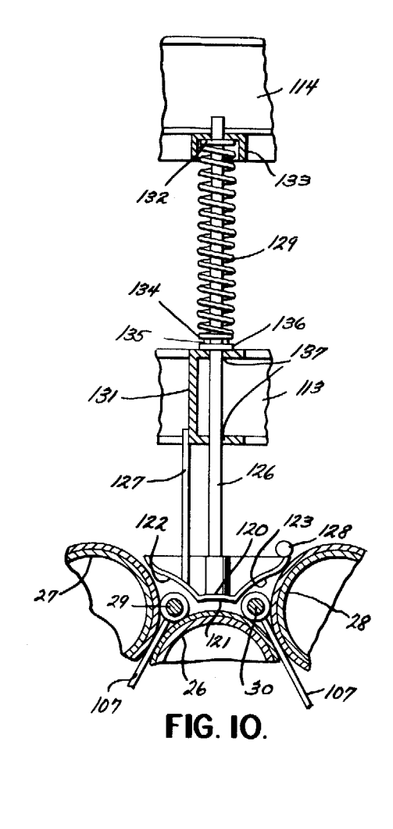
Figure 10 is a fragmentary transverse sectional view taken on the line 10—10 in Figure 9.

As shown more particularly in Figure 10 the stems 126 extend slidably through both frame sections 113, 114. Light coil springs 129 are wound about the stems 126 between collars 134 fast on the stems 126 and the upper frame section 114. The springs 129 reacting against the upper frame section 114 urge the collars or washers 134 and therefore the fingers 120 downwardly with pressure against the shrimp in the channels; yet at the same time, an accumulation of shrimp beneath the edge 121 of a finger 120 will permit the finger to rise relatively to the frame sections 113, 114 to prevent breakage of the parts or the mashing or mutilation of the shrimp below the finger 120.

The upper ends of the stems 126 slide freely through the upper finger frame section 114.

Still referring to Figure 10, the guide webs or vanes 127 are shown as slidable vertically alongside a substantially vertical flat surface 131 of the lower frame section 113. The guide web 127 is relatively wide and presents a large area both horizontally and vertically to the surface 131, the purpose of which is to prevent turning or rotation of the guide fingers 120 upon their stems 126, as such rotation of the fingers would move them out of alignment with the rollers and out of a correct position in the channel with respect to the rollers.

As many of the fingers 120 may be carried in each channel as desired.

In Figure 10 the upper end of the finger stem 126 is shown as playing loosely through a washer 132 confined in a socket 133 of the upper finger frame 114. The lower end of the spring is shown as abutting against a loose washer 134 which is retained in place by a cotter pin 135, below which is a loose washer 136. This arrangement provides a loose fit at the points 137 where the finger stem 126 rides up and down through openings in the upper and lower horizontal webs of the channel frame member 131 against which the guide finger slides flatwise to prevent rotation of the finger 120.

Referring more particularly to Figure 3 of the drawings the finger frame B in the lower forward section of the machine is also comprised of a lower section 138 having rollers or cam followers 139, 140 to rest upon cams 141 and 142 fixed to the cam shafts 31 and 32.

The upper section 143 of the finger frame B is supported by corner springs 144 adjusted as to tension by the adjusting nuts 145.

Figures 23, 24:
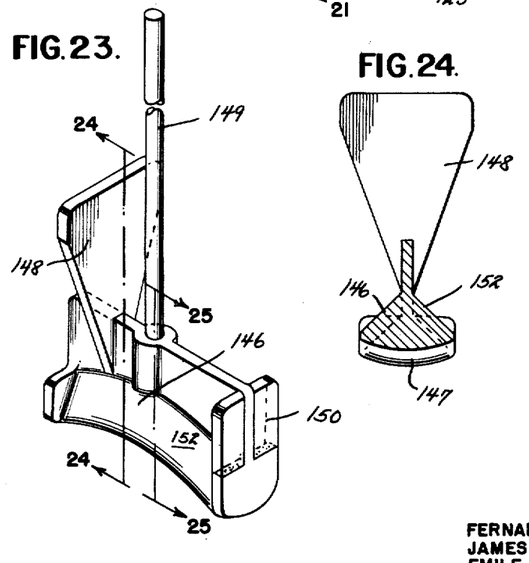
Figure 23 is a perspective view of a modified form of pressure finger used in another section of the machine.
Figure 24 is a vertical transverse section taken on the line 24—24 of Figure 23.
Figure 25:
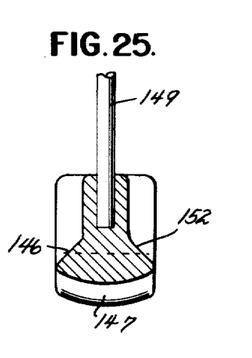
Figure 25 is a vertical central transverse section taken on the line 25—25 of Figure 23.

The channels in the lower section omit the insert rollers and therefore the fingers are of a somewhat different conformation as shown more particularly in Figures 23, 24 and 25.

Such fingers 146 have curved lower surfaces 147 which conform generally to the curvature of the idler rollers 37 against which they are adapted to fit. As shown in Figures 24 and 25, like Figure 21, the fingers are transversely convex to provide free entrance of the shrimp to pass beneath the fingers and finally free exit of the same. These fingers have flat guide fins or vanes 148 at one side of the center stems 149 and counter weights 150 at the other side of the stems 149.

In case of both sets of fingers shown in Figures 21–25 upper portions of the fingers are sloped as indicated at 151 and 152 to shed the shrimp.

The stem 149 slides freely up and down in the frame sections 138, 143 and coil springs 153 are wound about the stems 149 abutting at their upper ends against the upper frame 143 and at their lower ends against collars or washers 154 affixed to the stems 149.

The various rollers may be of rubber, or a suitable composition, to give friction contact with the hulls and other parts of the shrimp in a manner to facilitate the grasping of the shrimp by the roller surfaces and in the nips of the rollers.

The two or more finger frames A, B may be hinged at one side of the machine, as shown more particularly in Figures 2, 3, 6 and 8. For this purpose the main frame 20 carries a number of brackets 155 for supporting vertical stabilizer posts 156 on which vertically slide bearings 157. These bearings carry vertical leaves 158 of hinges, the horizontal leaves 159 of which are made fast to the lower finger frame sections 113, 138. The hinge pintles are indicated at 160.

The hinges permit the finger frames A or B to be swung upward on one side to expose the rollers for ready cleaning after use. The posts 156 act as stabilizers, guide posts and journals for the slide bearings 157 hinged to the lower finger frame sections 113, 138. These posts maintain the finger frames in proper position and eliminate any side movement of the frames as they are raised and lowered in the peeling operation. These stabilizer posts 156 are located only on the hinge sides of the finger frames. The other sides of the finger frames are supported against sag by small roller bearings 161 which are carried by the free edges of the lower frame sections, which bearings ride on the guide flanges or angle irons 162 bolted or otherwise secured to the side frame 20 of the machine.

Figure 6:
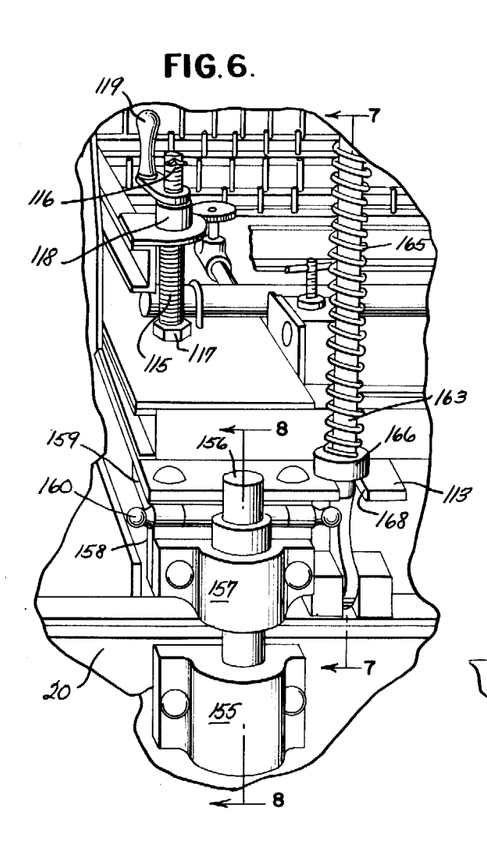
Figure 6 is a fragmentary perspective view taken at one of the stabilizer posts and hinge joints of one of the finger frames.
Figures 7, 8:
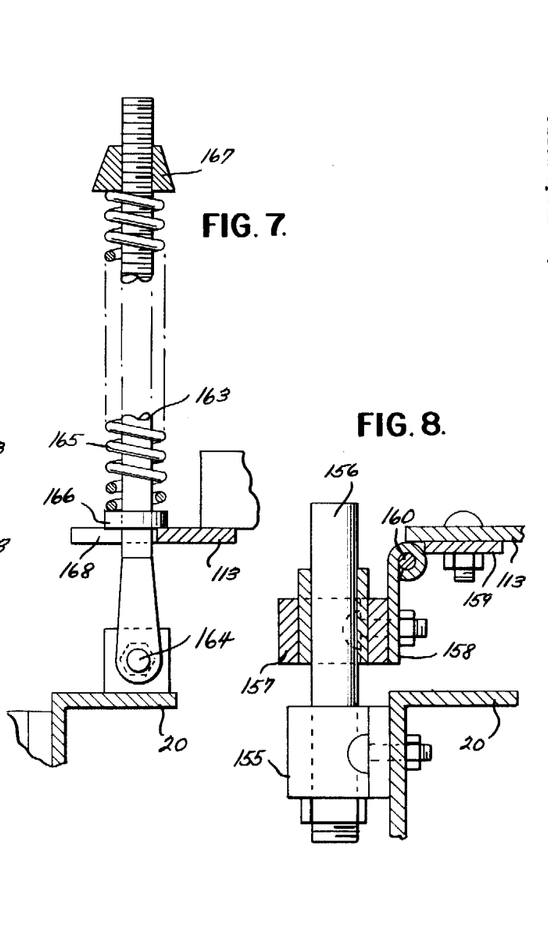
Figure 7 is a vertical transverse fragmentary section taken on the line 7—7 of Figure 6.
Figure 8 is a similar view taken on the line 8—8 of Figure 6.

Long bolts 163 are pivoted at 164 to the side frame 20 of the machine as shown more particularly in Figures 6 and 7. Coiled about the long bolts 163 are helical springs 165 which abut at their lower ends against washers or collars 166 freely slidable on the bolts 163. At their upper ends the coil spring 165 engage nuts 167 threaded adjustably upon the upper threaded sections of the bolts 163. The tension of the springs 165 is adjusted by rotating the nuts 167 in one or the other direction. The bolts 163 are adapted to swing into and out of slots 168 in the lower finger frame sections 113, 138. In the embodiment of the invention shown in Figure 1 there are eight such bolts 163, four to each finger frame A, B, and located at the corner portions of each such frame. The pressure on the springs 165 is adjustable by the nuts 167 which are shown to be wing nuts for convenience in manual rotation. These bolt and spring assemblies 163, 165 can be easily disengaged from the finger frames 113, 138 by means of the slots 168 in the frames. The pivots 164 are shown as so arranged that the bolts 163 may be swung outwardly away from the finger frames, permitting the raising of the frames on the hinges 160 for cleaning purposes.

The springs 165 through the collars 166 exert downward yieldable pressure upon the finger frames ensuring constant contact of the cam followers 111, 112, 139 and 140 with the respective cams 109, 110, 141 and 142. Without such spring pressure it is found that a heavy mat of shrimp may accumulate upon the peeling rollers to such extent as to prevent the finger frames from moving down to their lowest positions. In other words the cam followers must follow the cams down as the low points of the cams are presented to the cam followers and the springs 165 ensure such action. With constant contact maintained between the cam followers and the cam faces, the full effect of the pressure on the individual fingers is maintained against the shrimp.

Figures 26–29 show forms of adjustment for the cam followers.

Figures 26, 27, 28, 29:
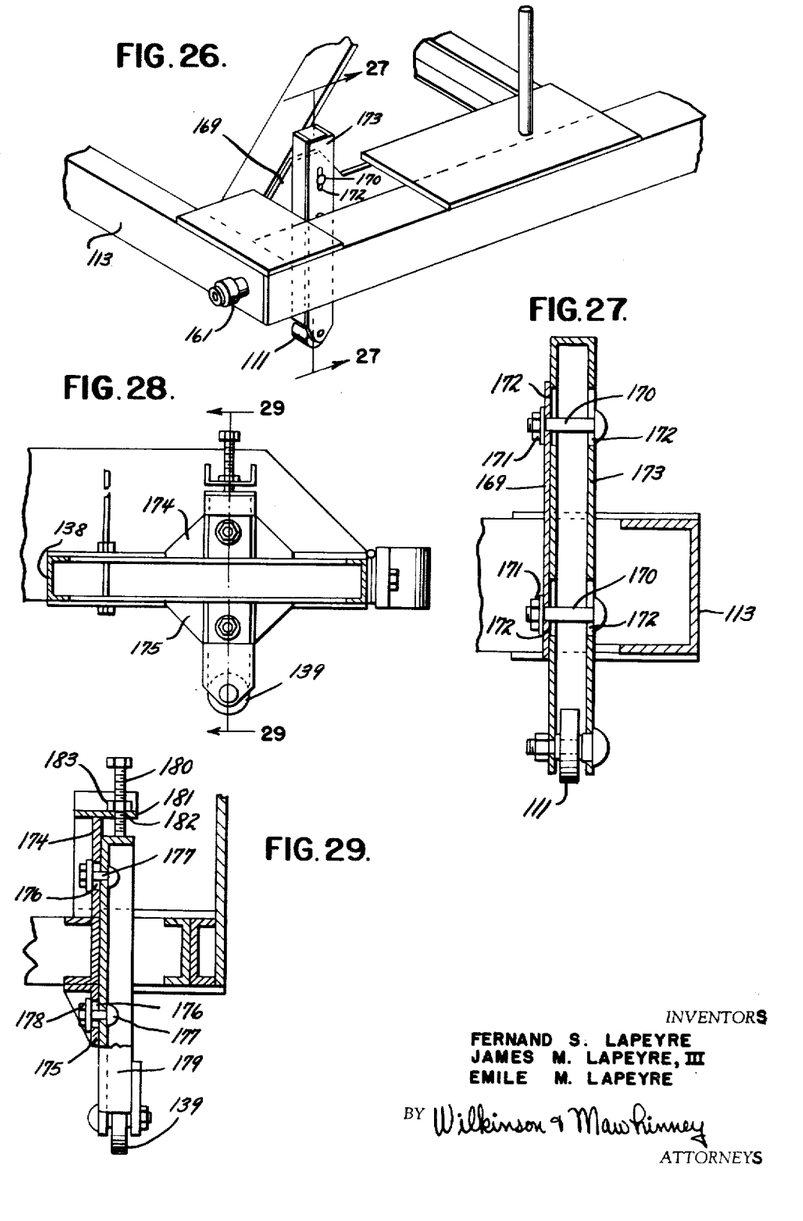
Figure 26 is a fragmentary perspective view of a corner portion of one of the bottom finger frames showing the adjustable cam follower and associated parts.
Figure 27 is a vertical sectional view taken on an enlarged scale on the line 27—27 of Figure 26.
Figure 28 is a fragmentary vertical section through a portion of a modified form of bottom finger frame showing a different form of adjustment for the cam follower.
Figure 29 is an enlarged vertical sectional view taken on the line 29—29 of Figure 28.

In Figures 26 and 27 the lower finger frame section 113 includes a vertical web 169 which carries one or more bolts 170 having nuts 171 threaded thereon. These bolts 170 extend through vertically elongated slots 172 in standards 173 which carry the cam followers 111, 112. By loosening the nuts 171 the standards 173 may be raised or lowered to bring the cam followers 111, 112 to the desired elevation; thereafter the nuts 171 being tightened, the adjustment is preserved.

Referring more particularly to Figures 28 and 29, the lower finger frame 138 carries webs 174 and 175 having slots 176 to receive bolts 177 having nuts 178. These bolts 177 are carried by standards 179 which carry the cam follower rollers 139, 140.

Adjusting screws 180 are threaded through overhead sections 181 of the finger frames in alignment with the standards 179.

The lower ends of such adjusting screws 180 engage the standards 179 so that when the nuts 178 are loosened, the adjusting screws 180 may be turned up or down through threaded openings 182 in such overhead sections 181. The screws 180 act as gauges. After the screws 180 are adjusted the upper ends of the standards 179 are moved firmly thereagainst after which the nuts 178 are tightened to secure the adjustment. Locking nuts 183 may be run on the adjusting screws 180 to bind against the overhead sections 181 to lock such adjusting screws 180 in adjusted position.

The reasons for the adjustability of the height of the cam followers is two fold: (1) In the first place adjustability is desirable for proper assembly of the machine, inasmuch as for normal operations, it is desirable to adjust the height of the finger frames so that the fingers, when in their lowest positions, have only a small (approximately one-eighth of an inch) clearance over the rollers. (2) Secondly, the normal clearance may have to be increased when unusually large shrimp are inserted into the machine.

It is preferred to employ a water flushing system, for instance, of the kind generally disclosed in our prior Patent 2,537,355. However, the present improvements are not particularly concerned with such water flushing systems and therefore only parts of the same are incidentally illustrated. For instance, in Figure 12, water flushing pipes 184 and 185 are shown as extending transversely across the machine beneath the mid-abutment 22 and the lower transverse beam 23 respectively. The pipe 184 has a nozzle 186 for directing a stream of water upwardly beneath the peeling rollers 26, 27, 28 and the insert rollers 29, 30 of the upper section. Another nozzle 187 directs water forwardly beneath the rollers 26, 37 of the lower section. The lower water pipe 185 has a nozzle 188 directed upwardly beneath the rollers 26, 37 of the lower section. Water is projected from these nozzles with such force as to wash the slime and adherent particles of hull from such rollers.

The shrimp meat is delivered to a trough 189 at the forward lower end of the machine, such trough extending at an inclination transversely. As shown in Figure 12 the trough is provided with an inclined baffle 189ª.

A pan 190 having convergent front and rear walls is carried beneath both peeling sections of the machine to receive the hulls and other matter separated from the meat in the peeling processes.

In operation shrimp are carried by the feeder belt 24 from a tank reservoir (not shown) at a controlled rate, into the guide trough 25, at the introductory end of the upper peeling section. This trough 25 spans all of the channels and distributes the shrimp into the channels or onto the rollers which guide the shrimp into the channels.

The object of the upper peeling section is to loosen the shell, feet, so called "swimmerettes" and gristle on the shrimp, to unwrap the shell from the meat, to pinch the tail sections, feet, "swimmerettes" and other small appendages, such as whiskers, from the meat, and to separate from the peeled and unpeeled matter, all non-edible portions as removed. The object of the lower peeling section is to loosen the remaining shells, feet, "swimmerettes" and gristle from the meats and to pinch the remaining shell, feet, "swimmerettes" and gristle from the meats.

The inclination of the channels and the rolling action of the peeling rollers will tend to cause the shrimp to move down the channels. This action may be facilitated by the water or other liquid sprays which may be employed if desired. Such liquid also acts to wash the rollers clear of slime and particles of the meat or hulls which might adhere to the rollers.

The rollers are given an oscillatory motion so that the shrimp are shifted alternately from one to the other side of the channels whereby the shrimp are presented in constantly changing positions to the nips between the rollers for fresh grips by such rollers to afford every opportunity for thorough peeling. The pressure fingers 120, 146 are caused to rise and fall in synchronous frequency with the oscillatory motion of the rollers. These pressure fingers are adjustably spring loaded as heretofore described and the extreme low positions of the pressure fingers are adjustable by the adjustment of the cam follower supports through the adjusting devices shown and described in connection with Figures 26–29. The action of the cams 109, 110 and 141, 142 may be so timed that the fingers 120, 146 rise when the rollers come to a stop during a cycle and the fingers are kept raised until reverse roller rotation has carried the shrimp over to the other side of the channel at which time the fingers may be lowered.

It will be noted from a comparison of Figures 2 and 3 that the cams 109, 110 of the upper section A differ in contour from the cams 141, 142 of the lower section B shown in Figure 3.

As the cam shifts 31 and 32 oscillate, the finger frames will be raised and lowered.

From an examination of Figure 3, it will be seen that the high points 191 and 192 of the cams 141 and 142 are substantially equal at opposite sides of the central low point 193; therefore as the cams 141, 142 are oscillated in opposite directions from the position shown in Figure 3, such cams will lift the cam follower 140 and finger frame B. In other words, there will be a lifting action when the cams 141, 142 are rocked in both clockwise and anti-clockwise directions from the positions of Figure 3 which will result in a rather uniform lifting and lowering of the finger frame B and the fingers carried thereby.

However in the case of Figure 2, the upper finger frame A and the fingers 120 carried thereby are only lifted by one side of the cams 109, 110 as such cams have virtually only one high point 194, at one side of the center of oscillation. The low point 195 of these cams is substantially continued around the other sides of the cams in the curved surface 196 which is struck on the arc having substantially the same radius as the low points 195 from the center of oscillation of the cams which is the center of axis of the cam shafts 31, 32.

Consequently the fingers 120 of the upper section will remain in the down position while the cam followers are in contact with the sections 195 and 196 of the cams 109, 110, and will only be raised when the cam followers are lifted by the high point 194. Therefore, the fingers 120 in the upper section remain in the down position over a longer period of time. This creates a longer "working period." It has been found that an improved peeling action follows from such longer "working period." By altering the cams 141, 142 of the lower section to conform with the contours of the cams 109, 110 of the upper section, the "working period" of the lower section could be likewise increased but care should be exercised to avoid excessive loss of pigmentation of the peeled meats as well as increased mutilation.

In order to keep the insert roller sections 29, 29ª and 30, 30ª in place and to prevent them from working loose from the bearings of the upper hold-down device 93, 107 and from the bearings 83, 84 of the insert keeper plates 79, 80, the cross piece 94 to which the upper hold-downs 93 are bolted under spring tension may be located slightly closer to the front of the machine than the journals 91 of the upper insert roller sections 29ª, 30ª. As a result there is a tendency to keep the journals within the bearings throughout the insert roller assembly.

Liquid supplied with the introduction of the shrimp or by the flushing system forces the shrimp from the upper peeling section into the lower peeling section of the machine.

The power rollers 26 extend to both the upper and lower peeling sections of the machine. These rollers are the bottom rollers in the upper sections and the top rollers in the bottom section.

The shrimp thus progress down the channels of both sections under the action of gravity and under the propelling force of the water stream, being moved from one side of the channel to the other by the reversal or rotation of the rollers and being subjected to peeling action at both sides of the channels and in both sections of the machine, the hulls being drawn through the nips of the rollers and deposited in the pan 190 below the machine while the meat is rejected at the nips and is caused to move all the way down the channels and finally delivered to the transverse trough, 189.

The machine efficiently accomplishes the loosening of the shell, feet, "swimmerettes" and gristle on the underside of the head section of the shrimp by having such shrimp held under proper pressure by the pressure fingers against moving surfaces of the rollers. Pressure is applied by the fingers under spring tension against the shrimp. The fingers hold the shrimp against the rollers.

A regulatory action of the loosening action of the shell, feet, "swimmerettes" and gristle is achieved by changing the degree of force with which the fingers act to hold the shrimp against the moving surfaces of the rollers. Such degree of force may be changed by adjusting the spring tension on the fingers. This is done by rotating the handles 119 and the wing nuts 167.

The machine accomplishes the unwrapping of the hulls from the shrimp meat, that is the withdrawing of the hull, either in whole or in part by causing only one side of the shell along its edge on the underside of the shrimp, to be caught in the rollers so that the pulling action of the rollers serves to draw the hull from the meat much as tape is unwrapped from a spool. As this unwrapping action occurs, the meat turns or revolves and the removal of the hull is accomplished without mutilation of the meats. This action is obtained in the upper section by the use of the small diameter insert rollers 29 and 30. It has been found that if one of the rollers in a combination of rollers is of sufficiently small diameter for the shrimp to enter closely to the line of contact of the rollers the edge of the hull can be grasped and the hull drawn from the meat without mutilation regardless of the diameter size of the other roller or rollers used in combination with the small diameter roller. The small diameter insert rollers 29 and 30 employed in the upper peeling section in conjunction with the large diameter power-driven rollers 26 effectively achieve the unwrapping action referred to. Also in the upper section, the small tail sections of the hull, the feet and other small appendages of the shrimp are afforded every opportunity of reaching sufficiently into the crotch or bight between the small diameter and large diameter rollers as to be grasped and pulled through the rollers. This object and purpose is furthered by the fact that the pressure fingers hold the shrimp in firm contact with the crotch portions of the rollers.

The machine also secures to a high degree the pinching of the hulls and gristle from the meats by the grasping action of large rollers. This action is secured principally in the lower peeling section by the use of large diameter rollers 26 and 37. Such large diameter rollers have a more gradual angle of attack on the shrimp in the crotch. This action is also furthered by use of the pressure fingers in holding the shrimp firmly in the working crotches of the rollers by adjustable tension.

The machine also accomplishes the separation of the hulls, feet and gristle from the edible meats. This is accomplished after peeling, or simultaneously with peeling, by the pulling action of the rollers on the hard surfaces of the non-edible parts of the shrimp causing them to pass through, and beyond, the line of contact of the rollers, while the edible meats, which are of a slippery nature, remain on the same side of the line of contact as introduced.

The machine is constructed and arranged to maintain traction of the rollers at all times so as to preserve their gripping power on the hulls, feet and tail sections by removing slime which would interfere with such action. Any suitable liquid such as water, may be used in proper quantities for flushing the moving surfaces free of such slime.

The machine automatically controls the rate of shrimp advance and by such control regulates the amount of work done on the shrimp so as to prevent loss of machine efficiency through unnecessary work on the shrimp, and yet insures the amount of work necessary to complete the peeling job. A regulated volume of flushing liquid on the upper sides of the rollers achieves this objective.

The rate of shrimp advance through the machine may also be controlled by the adjustment of the angle of inclination at which the channels are set. It has been found that angles of the order of ten to twelve degrees will be of assistance in promoting advancement of the shrimp along the channels. However the channels may be horizontal throughout if the flow of liquid on the upper side of the rollers is increased.

A third method of regulating the rate of advance of the shrimp through the machine is by the timing of the pressure fingers employed to hold the shrimp in the crotches of the rollers. During the intervals that the shrimp are held under pressure by the fingers, they cannot move along the channels, regardless of the quantity of liquid used for flushing the shrimp along the channels and regardless of the angle at which the rollers may be placed. However, as the fingers are elevated and pressure on the shrimp released, the shrimp may advance unhampered by the fingers. The shape of the cams may be selected for the purpose of varying the time interval during which shrimp are held by the fingers.

In the upper section with the small insert rollers the nips or crotches between the rollers form a relatively large angle of attack for the unwrapping action heretofore described, while in the lower section due to the large diameters of both rollers a more gradual or smaller angle of attack is presented to the shrimp.

The lower surfaces of the pressure fingers are non-rotary and are opposed to the rotary surfaces of the power rollers 26 in the upper section and the base rollers 37 in the lower section. When the fingers are in the down position the shrimp tend to be held stationary as to their upper portions in contact with the fingers and tend to be rotated as to their lower portions which are in contact with the moving rollers, with the result that the shell is locally caused to be displaced and dislocated and to slide off the meat. This is one action to which the shrimp is subjected in both sections. The second action is the unraveling or unwrapping action which takes place in the upper section, and a third action is the pinching action which takes place in the lower section.

While we have disclosed herein the best form of the invention known to use at the present time, we desire it to be understood that we reserve the right to make changes and modifications in the herein described embodiment of the invention provided such changes fall within the scope of the following claims.

What is claimed is:

1. A machine for peeling shrimp or the like, comprising a bottom roller on said machine, parallel side rollers on said machine disposed on opposite sides of the bottom roller and spaced therefrom and elevated therefrom to form a peeling channel with the bottom roller for the shrimp, insert rollers operatively associated with the machine and positioned between the bottom and side rollers, and hold-down means for said insert rollers operatively associated with said bottom and side rollers extending movably down through the spaces between the bottom and side rollers and having a resilient connection to said machine.

2. A machine for peeling shrimp or the like, comprising a bottom roller, side rollers disposed on opposite sides of the bottom roller and spaced therefrom at opposite sides and elevated therefrom to form a channel with the bottom roller for the shrimp, sectional insert rollers associated with said bottom and side rollers and occupying the space between the bottom and side rollers, hold-down means for said insert rollers comprising straps extending movably down through the spaces between the bottom and side rollers and having a resilient connection to said machine, and trunnions on the upper end portions of the straps operatively associated with the sections of said insert rollers.

3. A machine for peeling shrimp or the like, comprising a bottom roller, side rollers spaced from the bottom roller at opposite sides and elevated therefrom to form a channel for the shrimp, insert rollers between the bottom and side rollers and occupying the spaces between the bottom roller and the side rollers within the channel, hold-down devices and keepers operatively associated with the insert rollers to hold them in peripheral contact with the bottom roller and side rollers comprising a bearing, relatively-rotatable members on said bearing, trunnions and bearings between said members and the insert rollers, and resilient means connected to said members for tending to rotate the same to exert downward pressure on said insert rollers.

4. A machine for peeling shrimp or the like, comprising an inclined bottom roller, inclined side rollers disposed on opposite sides of the bottom roller operatively associated with said machine in spaced relation with the bottom roller and elevated therefrom to form a channel for the shrimp, inclined sectional insert rollers occupying the spaces between the bottom roller and the side rollers in the channel and having trunnions, upper and intermediate straps fitted slidably through the spaces between the bottom and side rollers and having resilient connections to the machine, said sectional rollers having partial axial bores in their ends forming bearing recesses, trunnions on the ends of said upper and lower straps received into said bearing recesses at upper and lower ends of said insert rollers, a pair of rotary plates having bearings for receiving the lower end trunnions of the insert rollers and for fitting against the lower ends of said insert rollers, means to bias said plates to rotate the same in the sense to exert downward pressure on said insert rollers, and thrust means below said plates to retain the same in place while permitting of the free rotation of the plates in order to prevent the plates from backing off from the insert rollers.

5. A machine for peeling shrimp or the like comprising bottom and side rollers positioned to define peeling channels having a crotch between each bottom and side roll, insert rollers operatively associated with said bottom and side rollers and being receivable into the crotch therebetween, hold-down straps fitted slidably through the crotch between said bottom and side rolls, a pair of rotary plates operatively associated with said insert rollers, means associated with said plates to rotate same in the sense to exert downward pressure on said insert rollers, and thrust means associated with said plates and insert rollers to permit free rotation of said plates to prevent said plates from backing off from said insert rollers.

References Cited in the file of this patent
UNITED STATES PATENTS

| | | |
|---|---|---|
| 2,537,355 | Lapeyre et al. | Jan. 9, 1951 |
| 2,574,044 | Lapeyre et al. | Nov. 6, 1951 |

Dedication 2,778,055.—*Fernand S. Lapeyre* and *James M. Lapeyre III*, New Orleans, and *Emile M. Lapeyre*, Houma, La. MACHINE FOR PEELING SHRIMP. Patent dated Jan. 22, 1957. Dedication filed Aug. 30, 1967, by the assignee, *The Laitram Corporation*.

Hereby dedicates the term of said patent to the People of the United States of America.

[*Official Gazette October 3, 1967.*]